United States Patent
Hsieh

(10) Patent No.: US 7,411,484 B2
(45) Date of Patent: Aug. 12, 2008

(54) STEERING WHEEL LOCK HAVING AN ULTRASONIC-WAVE ALARM SYSTEM

(76) Inventor: Chen-Kuei Hsieh, 235 Chung-Ho, Box 8-24, Taipei (TW)

( * ) Notice: Subject to any disclaimer, the term of this patent is extended or adjusted under 35 U.S.C. 154(b) by 274 days.

(21) Appl. No.: 11/429,358

(22) Filed: May 8, 2006

(65) Prior Publication Data

US 2007/0257784 A1 Nov. 8, 2007

(51) Int. Cl.
*B60R 25/10* (2006.01)

(52) U.S. Cl. .............. 340/426.31; 340/426.1

(58) Field of Classification Search .......... 340/426.1, 340/426.11, 426.24, 426.28, 426.33; 702/197, 702/184
See application file for complete search history.

(56) References Cited

U.S. PATENT DOCUMENTS 5,396,215 A * 3/1995 Hinkle ............ 340/426.17
7,233,231 B2 * 6/2007 Hsieh ................ 340/426.1

* cited by examiner

*Primary Examiner*—George A Bugg
*Assistant Examiner*—Shirley Lu

(57) ABSTRACT

A steering wheel lock having an ultrasonic-wave alarm system includes a lock main body to be mounted on a steering wheel so that the rotation of the steering wheel is constrained and an anti-theft alarm circuit located within an outer shell of the lock main body, which is activated upon the engagement of the lock main body and the steering wheel. The anti-theft alarm circuit further includes at least a set of detecting unit and a central processing unit (CPU) for detecting a moving body in the automobile. The detecting unit consists of an ultrasonic wave emitter for sending ultrasonic waves toward the inner space of the automobile and an ultrasonic wave receiver for receiving and treating the reflected waves. The treated signals are sent to the CPU for recognition. If the signals are anomalous, the anti-theft alarm circuit will start a predetermined alarming process to scare away suspicious people and to notify the automobile owner.

5 Claims, 3 Drawing Sheets

STEERING WHEEL LOCK HAVING AN ULTRASONIC-WAVE ALARM SYSTEM

FIELD OF THE INVENTION

The present invention relates to steering wheel locks, more particularly to a steering wheel lock having an ultrasonic-wave alarm system.

BACKGROUND OF THE INVENTION

In order to prevent car theft, automatic owners often use steering wheel locks and shift locks in their cars. Although those locks have stiff structures that cannot be destroyed easily, they are susceptible to sophisticated stealing techniques, and it is a matter of time to unlock them. Therefore, anti-theft means using conventional locks is not effective.

Further, automobile anti-theft devices of electronic types are nowadays often used to prevent theft by detecting a stealing intention in advance. This type of electronic alarm systems are usually powered by car battery and activated by anomalous vibrations of the car body. To operate the system, the detecting sensors connected to the control circuit can detect anomalous motions, such as shocks and car door intrusions, and then the an alarm is activated to produce loud sounds, scaring a thief away. However, since the electronic devices are powered by the car batteries, they are complicated to install and easy to be disconnected (therefore, losing the alarm function). It is a further disadvantage that an electronic alarm and a steering wheel lock are independent devices, and therefore double-protecting a car is expensive. It is another disadvantage that conventional automobile alarms can be easily activated by surround shock waves and would annoy the surrounding residents, which may cause an expectation of "false alarm" and reduce the preventive effect of the alarms.

SUMMARY OF THE INVENTION

Accordingly, the primary objective of the present invention is to provide a steering wheel lock having an ultrasonic-wave alarm system, which has the merits of electronic detection/alarm and the stiffness of mechanical car locks. The invention comprises an electronic anti-theft alarm circuit and a mechanical steering wheel lock on which the circuit is attached. The anti-theft alarm circuit further includes an ultrasonic detecting unit for monitoring surrounding anomalies. When a car is invaded without permission, the detecting unit can sense anomalous motions within the car, thereby activating alarming signals. The mechanical lock further reinforces the anti-theft means by locking the steering wheel of the car.

To achieve above object, the present invention provides a steering wheel lock having an ultrasonic-wave alarm system. The wheel lock comprises: a mechanical lock to be mounted on a steering wheel so that the rotation of the steering wheel is limited; and an anti-theft alarm circuit located within a top shell of the lock, the anti-theft alarm circuit being activated upon the engagement of the lock and the steering wheel, the anti-theft alarm circuit further including at least a set of detecting unit and a central processing unit for detecting moving objects inside an automobile, the detecting unit consisting of an ultrasonic wave emitter for sending ultrasonic waves outwardly and an ultrasonic wave receiver for receiving/treating ultrasonic waves reflected back, the reflected waves being sent to the central processing unit for recognition, whereby signals being recognized as anomalous will trigger a predetermined alarming process. The ultrasonic wave emitter further comprises a high-frequency signal generating circuit loop and an emitting unit, the high-frequency signal generating circuit loop generating periodic ultrasonic signals with predetermined frequencies, the detecting unit sending the generated ultrasonic signals toward an inner space of the automobile; and wherein the ultrasonic wave receiver further comprises an ultrasonic-wave receiving unit and a signal amplifying circuit loop for receiving and treating the reflected ultrasonic waves, the treated signals being sent to the central processing unit for recognition.

The various objects and advantages of the present invention will be more readily understood from the following detailed description when read in conjunction with the appended drawings.

DETAILED DESCRIPTION OF THE PREFERRED EMBODIMENTS

Figure 1:
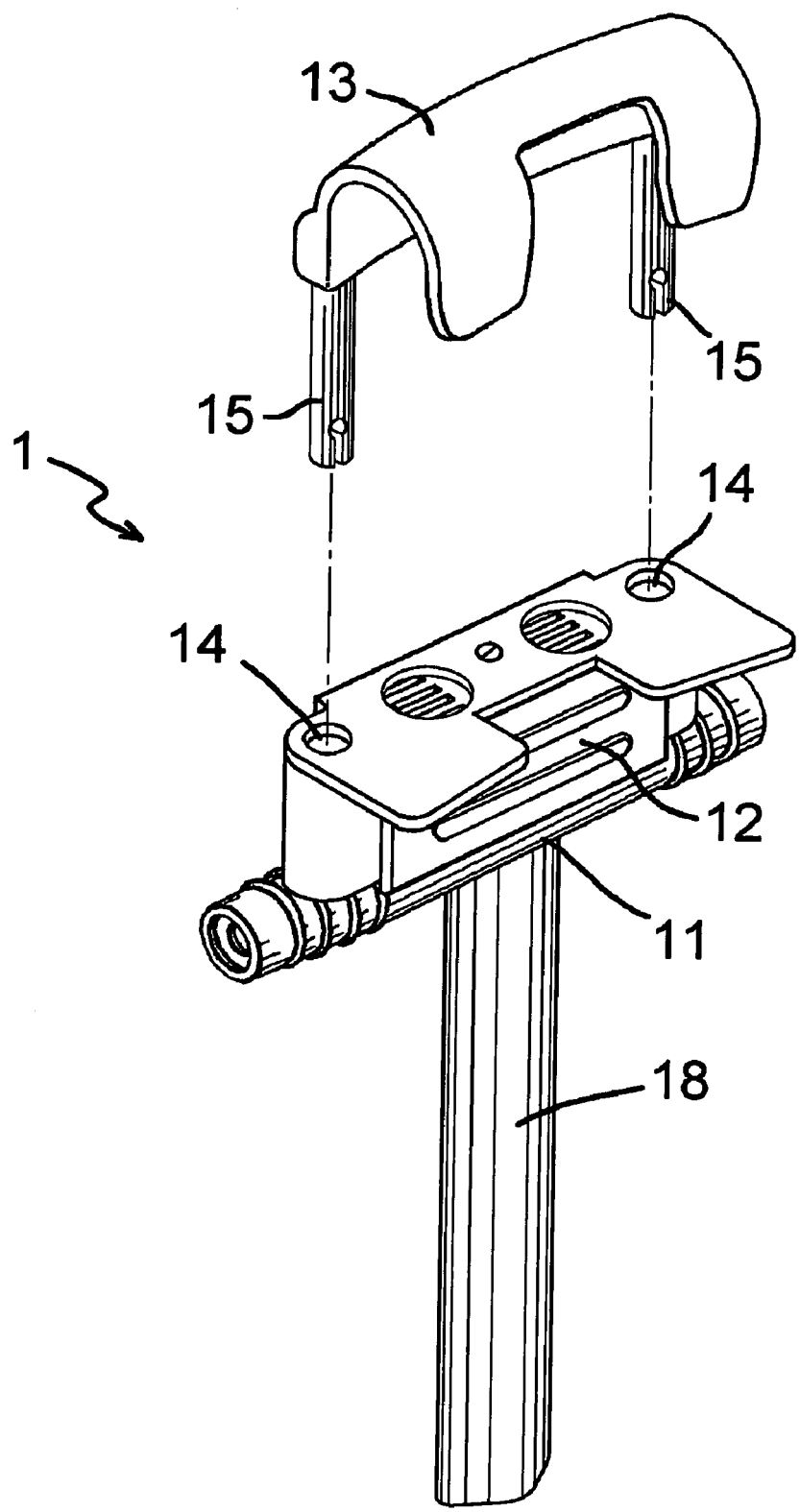
FIG. 1 is a perspective view of a steering wheel lock having an ultrasonic-wave alarm system of the present invention.
Figure 2:
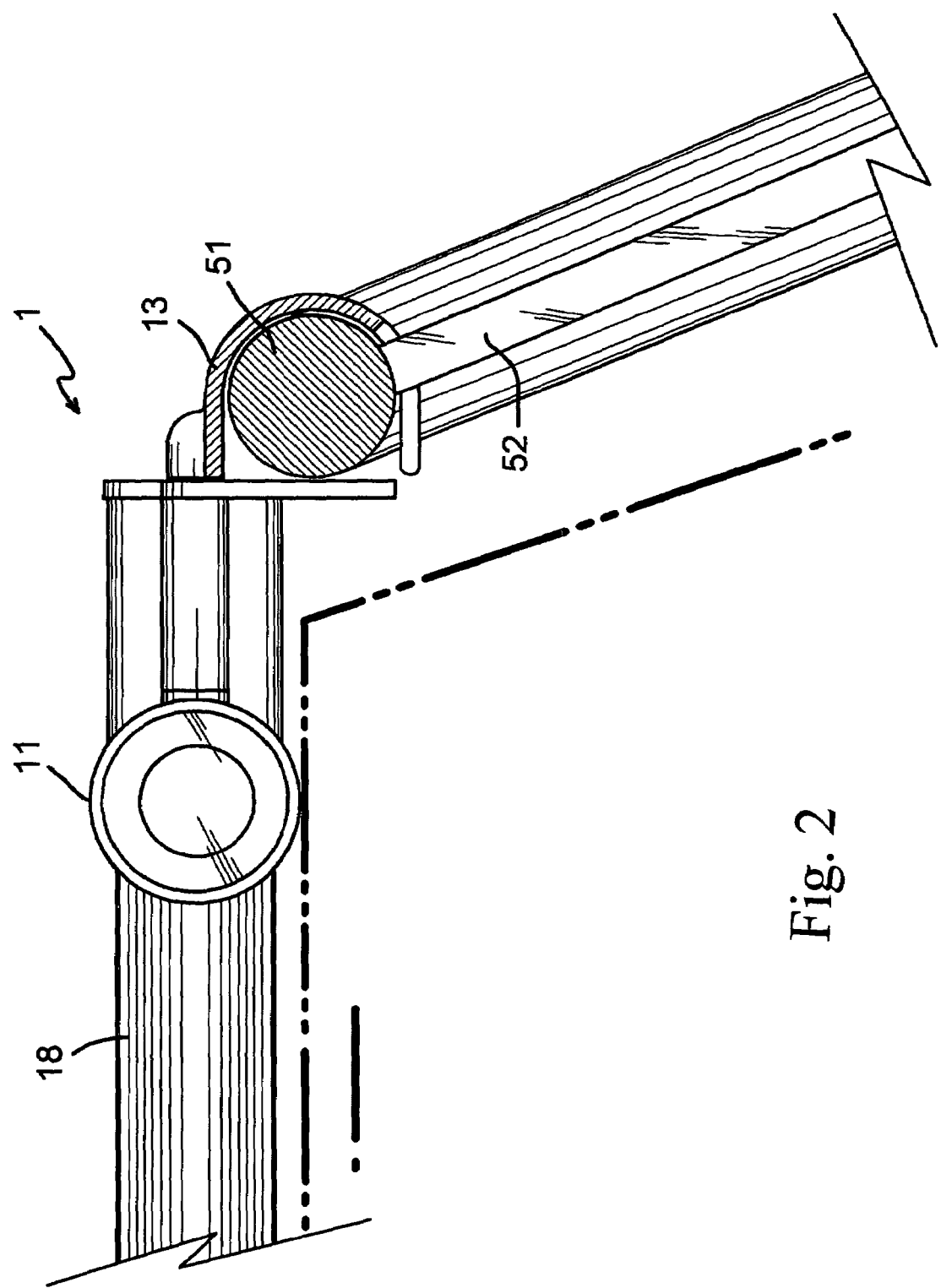
FIG. 2 is a lateral cross-sectional view of the steering wheel lock having an ultrasonic-wave alarm system of FIG. 1 mounted on a steering wheel.

Referring to FIGS. 1 and 2, a steering wheel lock having an ultrasonic-wave alarm system is a lock 1 engaged with a steering wheel comprising a lock main body 11, a lock mount 12 and a lock outer shell 13. There is a set of regular lock components disposed in the lock main body 11. The lock mount 12 further includes an anti-theft alarm circuit element. The top of lock mount 12 is connected with the lock outer shell 13 whose cross section takes a C shape. Two sides of the lock mount 12 are each provided with a insertion hole 14 for the insertion of a corresponding one of two engagement parts 15 extended underneath the lock outer shell 13. There is a elongated rod body 18 extended from the bottom of the lock main body 11. To use the lock 1, the lock outer shell 13 is firstly attached to the steering wheel ring 51, whereby the recessed inner portion of lock outer shell 13 is engaged with the steering wheel spoke 52. The engagement parts 15 of the lock outer shell 13 are then inserted into the insertion holes 14 of the lock mount 12. The rod body 18 from the lock main body 11 is extended onto the top of the driver's panel. Thereby, the motion of the steering wheel is constrained. As the lock 1 is secured, the inner anti-theft alarm circuit is activated to detect anomalous movements within the car. Once it detects anomalies, the circuit will trigger the emission of warning lights and sounds.

The anti-theft alarm circuit further includes at least a set of detecting unit and a central processing unit (CPU) for detecting a moving body in the automobile. The detecting unit sends ultrasonic waves toward the inner space of the automobile and receives/treats the reflected waves. The treated signals are sent to the CPU for recognition. If the signals are anomalous, the anti-theft alarm circuit will start a predetermined alarming process to scare away suspicious people and to notify the automobile owner.

Figure 3:
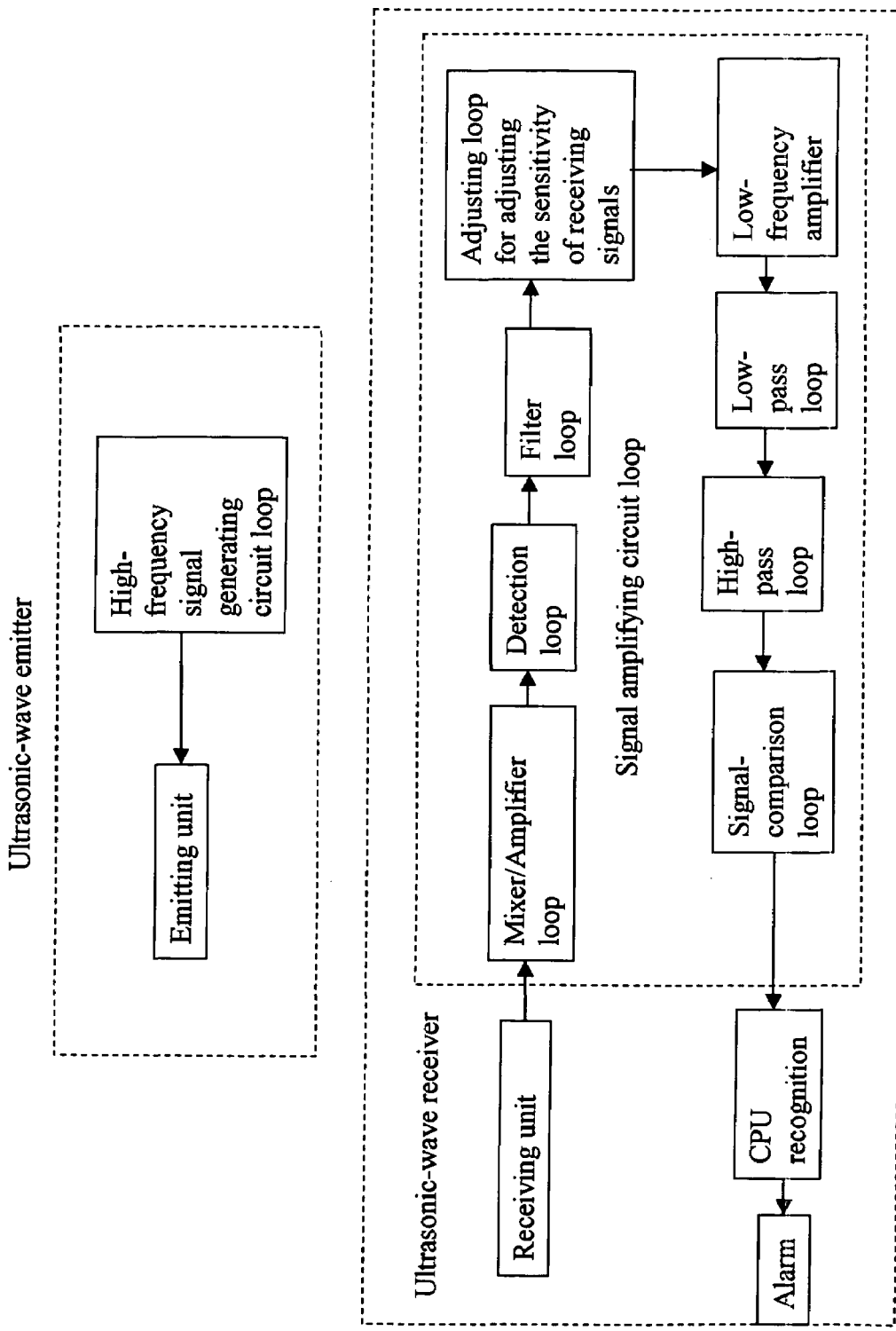
FIG. 3 is a system block diagram of the ultrasonic-wave detecting unit of the present invention.

Referring to FIG. 3, the detecting unit consists of an ultrasonic wave emitter for sending ultrasonic waves toward the inner space of the automobile and an ultrasonic wave receiver for receiving and treating the reflected waves. The ultrasonic wave emitter further comprises a high-frequency signal generating circuit loop and the emitter, whereby periodic ultrasonic signals with predetermined frequencies (for example, 40 kHz or other frequencies determined by the clock in the CPU) will be generated. The detecting unit sends the ultrasonic signals toward the inner space of the automobile.

The ultrasonic wave receiver further comprises an ultrasonic-wave receiving unit and a signal amplifying circuit loop, which signal amplifying circuit loop consists of a mixer/amplifier loop, a detection loop, a low-pass filter, a low-frequency amplifier, a low-pass loop, a high-pass loop and signal-comparison loop. Thereby, the ultrasonic-wave receiving unit receives the reflected ultrasonic signals from the inner space of the car, and the mixer/amplifier loop amplifies the signals. The amplified signals are then treated by the detection loop and the low-pass filter, and the low-frequency part of the signals is amplified by the low-frequency amplifier. The low-pass loop attenuates the high-frequency part of the signals (above 30 Hz), whereas the high-pass loop attenuates the high-frequency part of the signals (below 1.5 Hz). The processed signals are sent to the signal-comparison loop and then the CPU for recognition. If the width of the signals at high electric potential is less than 5 ms, it is discarded; if it is greater than 5 ms, the CPU starts a counting with a 1.5 s period. When the number of counts per period is greater than 16, the alarming sequence starts. The above recognition methods may largely enhance the precision of the ultrasonic anti-theft detection.

Further, the ultrasonic wave receiver further includes an adjusting loop for adjusting the sensitivity of receiving signals. The loop mainly comprises a variable resistor.

In summary, under a preset condition for starting an anti-theft alarm, the detecting unit of the present invention can detect anomalous object moving within the car when a car thief is managed to invade the inner space of the car. The alarm system is then activated to send predetermined light and sound signals to scare away the thief and to notify the car owner. The mechanical lock 1 of the present invention mounted on the steering wheel can delay the process of car theft.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A steering wheel lock having an ultrasonic-wave alarm system, comprising:

a mechanical lock to be mounted on a steering wheel so that the rotation of said steering wheel is limited; and an anti-theft alarm circuit located within a top shell of said lock, said anti-theft alarm circuit being activated upon the engagement of said lock and said steering wheel, said anti-theft alarm circuit further including at least a set of detecting unit and a central processing unit for detecting moving objects inside an automobile, said detecting unit consisting of an ultrasonic wave emitter for sending ultrasonic waves outwardly and an ultrasonic wave receiver for receiving/treating ultrasonic waves reflected back, said reflected waves being sent to said central processing unit for recognition, whereby signals being recognized as anomalous will trigger a predetermined alarming process.

2. The steering wheel lock having an ultrasonic-wave alarm system of claim 1 wherein said ultrasonic wave emitter further comprises a high-frequency signal generating circuit loop and an emitting unit, said high-frequency signal generating circuit loop generating periodic ultrasonic signals with predetermined frequencies, said detecting unit sending said generated ultrasonic signals toward an inner space of said automobile; and wherein said ultrasonic wave receiver further comprises an ultrasonic-wave receiving unit and a signal amplifying circuit loop for receiving and treating said reflected ultrasonic waves, said treated signals being sent to said central processing unit for recognition.

3. The steering wheel lock having an ultrasonic-wave alarm system of claim 2 wherein said signal amplifying circuit loop consists of a mixer/amplifier loop, a detection loop, a low-pass filter, a low-frequency amplifier, a low-pass loop, a high-pass loop and signal-comparison loop, thereby said reflected signals being amplified by said mixer/amplifier loop, treated by said detection loop and said low-pass filter, further amplified at low-frequency part by said low-frequency amplifier, attenuated at high-frequency part by said low-pass loop and attenuated at high-frequency part by said low-pass loop; said processed signals being sent to said signal-comparison loop and then said central processing unit for recognition; said central processing unit using algorithms judging the effectiveness of a signal peak and the number of counts of effective signals within a predetermined period to enhance the precision of the ultrasonic anti-theft detection.

4. The steering wheel lock having an ultrasonic-wave alarm system of claim 2 wherein said ultrasonic wave receiver further includes an adjusting loop for adjusting the sensitivity of receiving signals.

5. The steering wheel lock having an ultrasonic-wave alarm system of claim 4 wherein said adjusting loop mainly comprises a variable resistor.

* * * * *